United States Patent
Wang

(10) Patent No.: US 8,437,127 B2
(45) Date of Patent: May 7, 2013

(54) FIXING MECHANISM FOR FIXING A PORTABLE DEVICE AND RELATED COMPUTER SYSTEM

(75) Inventor: Jo-Chiao Wang, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 188 days.

(21) Appl. No.: 13/086,333

(22) Filed: Apr. 13, 2011

(65) Prior Publication Data

US 2011/0255243 A1    Oct. 20, 2011

(30) Foreign Application Priority Data

Apr. 14, 2010  (TW) ................................ 99111598 A

(51) Int. Cl.
*G06F 1/16*    (2006.01)
*H05K 5/00*    (2006.01)
*H05K 7/00*    (2006.01)

(52) U.S. Cl.
USPC ............ 361/679.35; 361/679.33; 361/679.37

(58) Field of Classification Search . 361/679.33–679.45
See application file for complete search history.

(56) References Cited

U.S. PATENT DOCUMENTS

| | | | |
|---|---|---|---|
| 6,396,686 B1 * | 5/2002 | Liu et al. | 361/679.33 |
| 6,628,514 B2 * | 9/2003 | Chen | 361/679.33 |
| 6,665,177 B2 * | 12/2003 | Chen | 361/679.58 |
| 6,728,109 B1 * | 4/2004 | Wu | 361/747 |
| 6,757,164 B2 * | 6/2004 | Lin | 361/679.35 |
| 6,853,549 B2 * | 2/2005 | Xu | 361/679.39 |
| 7,233,490 B1 * | 6/2007 | Lai | 361/679.33 |
| 7,259,960 B2 * | 8/2007 | Hua et al. | 361/679.33 |
| 7,359,189 B2 * | 4/2008 | Chiang et al. | 361/679.33 |
| 7,369,403 B2 * | 5/2008 | Chen et al. | 361/679.33 |
| 7,428,147 B2 * | 9/2008 | Lin | 361/679.33 |
| 7,441,744 B2 * | 10/2008 | Chen et al. | 248/694 |
| 7,495,908 B2 * | 2/2009 | Zhang et al. | 361/679.33 |

(Continued)

FOREIGN PATENT DOCUMENTS

| | | |
|---|---|---|
| CN | 2611963 Y | 4/2004 |
| CN | 1756467 A | 4/2006 |

(Continued)

OTHER PUBLICATIONS

Office action mailed on Aug. 9, 2012 for the Taiwan application No. 099111598, p. 1 line 14, p. 2, p. 3 line 1-18.

(Continued)

*Primary Examiner* — Adrian S Wilson
(74) *Attorney, Agent, or Firm* — Winston Hsu; Scott Margo

(57) ABSTRACT

A fixing mechanism for fixing a portable device includes a casing. A track is disposed on the casing for guiding the portable device to slide. At least one hole is formed on the casing. The fixing mechanism further includes a resilient component, which includes a wedging part fixed on the casing and at least one bending part. An end of the bending part passes through the hole and inserts into an opening of the portable device so as to fix the portable device inside the casing. The resilient component further includes at least one torsional part. An end of the torsional part is connected to the wedging part, and the other end of the torsional part is connected to the other end of the bending part. The torsional part is for providing torsional force to drive the end of the bending part to pass through the hole of the casing.

14 Claims, 7 Drawing Sheets

U.S. PATENT DOCUMENTS

| | | | |
|---|---|---|---|
| 7,495,909 B1* | 2/2009 | Chen et al. | 361/679.37 |
| 7,551,434 B2* | 6/2009 | Zhu et al. | 361/679.33 |
| 7,558,055 B2* | 7/2009 | Chen et al. | 361/679.32 |
| 7,656,654 B2* | 2/2010 | Liu et al. | 361/679.33 |
| 7,794,260 B2* | 9/2010 | Chen et al. | 439/329 |
| 7,823,934 B2* | 11/2010 | Huang et al. | 292/143 |
| 7,826,209 B2* | 11/2010 | Chen et al. | 361/679.37 |
| 7,830,654 B2* | 11/2010 | Hsieh et al. | 361/679.33 |
| 7,950,752 B2* | 5/2011 | Lin | 312/333 |
| 8,132,869 B2* | 3/2012 | Wang et al. | 312/223.2 |
| 8,191,842 B2* | 6/2012 | Tsai | 248/222.12 |
| 8,287,058 B2* | 10/2012 | Zhu et al. | 312/223.2 |
| 2004/0070929 A1* | 4/2004 | Lin | 361/685 |
| 2006/0017355 A1* | 1/2006 | Lan | 312/223.2 |
| 2006/0044750 A1* | 3/2006 | Chen | 361/685 |
| 2006/0139871 A1* | 6/2006 | Chen et al. | 361/685 |
| 2007/0121285 A1* | 5/2007 | Liang et al. | 361/685 |
| 2007/0145866 A1* | 6/2007 | Huang et al. | 312/215 |
| 2007/0164170 A1* | 7/2007 | Huang et al. | 248/27.1 |
| 2007/0235625 A1* | 10/2007 | Liang et al. | 248/675 |
| 2007/0279860 A1* | 12/2007 | Zheng et al. | 361/685 |
| 2008/0128570 A1* | 6/2008 | Chen | 248/220.21 |
| 2008/0136298 A1* | 6/2008 | Xiao | 312/223.2 |
| 2008/0137295 A1* | 6/2008 | Chen | 361/695 |
| 2009/0091882 A1* | 4/2009 | Liu et al. | 361/679.33 |
| 2009/0139281 A1* | 6/2009 | Chen | 70/63 |
| 2009/0189042 A1* | 7/2009 | Chen et al. | 248/309.1 |
| 2009/0310294 A1* | 12/2009 | Hsieh et al. | 361/679.33 |
| 2010/0001157 A1* | 1/2010 | Chen et al. | 248/306 |
| 2011/0249398 A1* | 10/2011 | Wang et al. | 361/679.58 |

FOREIGN PATENT DOCUMENTS

| | | |
|---|---|---|
| TW | 515638 | 12/2002 |
| TW | I284498 | 7/2007 |
| TW | M323789 | 12/2007 |

OTHER PUBLICATIONS

Office action mailed on Jul. 3, 2012 for the China application No. 201010157886.2, p. 3 line 6-36.

* cited by examiner

FIXING MECHANISM FOR FIXING A PORTABLE DEVICE AND RELATED COMPUTER SYSTEM

BACKGROUND OF THE INVENTION

1. Field of the Invention

The present invention relates to a fixing mechanism for fixing a portable device and a related computer system, and more particularly, to a fixing mechanism utilizing a resilient component to fix a portable device and a related computer system.

2. Description of the Prior Art

Computers need to be taken apart when replacing broken components or upgrading components inside the computers. However, it is often inconvenient for users to disassemble a storage device. such as a hard disk, from a computer. Therefore, mechanical design for the computer capable of being disassembled easily is necessary.

Please refer to FIG. 1. FIG. 1 is a diagram of a computer mechanism 10 in the prior art. The computer mechanism 10 includes a casing 11, a power supply 12 disposed on a right rear side of the casing 11, a fixing frame 13 disposed on a right front side of the casing 11 for fixing an optical disk drive, and a fixing frame 14 disposed under the fixing frame 13 for fixing a hard disk. A plurality of fixing holes 17 is formed on two sides (a right side and a left side) of the fixing frame 14. A hard disk 15 can be installed into the casing 11 through a front side, a rear side, or an upper side of the casing 11. A plurality of screwing holes 16 is formed on two sides (a right side and a left side) of the hard disk 15, and the hard disk 15 can be fixed on the fixing frame 14 by utilizing screws to pass through the screwing holes 16 and the fixing holes 17.

When disassembling the hard disk 15, the hard disk 15 has to be disassembled after disassembling an optical disk drive and the screws from the two sides of the fixing frame 14. Due to limited space of the computer mechanism 10, it is difficult to disassemble the hard disk 15. For example, if the hard disk is installed into the casing through the rear side of the computer mechanism, the power supply 12 has to be disassembled before disassembling the hard disk. Therefore, it is difficult to fix the hard disk on the casing via the screws within the limited space inside the casing no matter whereinto the hard disk is installed.

There are a lot of conventional mechanical designs of the portable storage device for solving the above-mentioned drawbacks. For example, a conventional portable storage device with convenient assembly is disclosed in TW patent no. I259449, which is for increasing assembly efficiency of the portable storage device and simplifying disassembly of the portable storage device. However, the conventional portable storage device needs screws for connecting the components of the portable storage device. The conventional portable storage device has complicated assembly, and the complicated assembly spends working hours.

SUMMARY OF THE INVENTION

The present invention provides a fixing mechanism for fixing a portable device and a related computer system for solving above drawbacks.

According to the claimed invention, a fixing mechanism includes a casing whereon a track is disposed, and a resilient component. The track is for guiding a portable device to slide, and at least one hole is formed on the casing. The resilient component includes a wedging part fixed on the casing, and at least one bending part. An end of the bending part passes through the hole on the casing and inserting into an opening on the portable device so as to fix the portable device inside the casing. The resilient component further includes at least one torsional part. An end of the torsional part is connected to the wedging part, the other end of the torsional part is connected to the other end of the bending part, and the torsional part is for providing torsional force to the bending part so as to drive the end of the bending part to pass through the hole on the casing.

According to the claimed invention, the fixing mechanism further includes a fixing shaft passing through the casing, and the torsional part of the resilient component sheathing the fixing shaft.

According to the claimed invention, the casing further includes a hook structure, and the wedging part of the resilient component is wedged inside the hook structure.

According to the claimed invention, the bending part is a U-shaped structure.

According to the claimed invention, the torsional part is a torsional spring.

According to the claimed invention, the wedging part, the bending part, and the torsional part are integrated monolithically.

According to the claimed invention, the casing further includes at least one blocking component for blocking a side of the portable device when the portable device is installed inside the casing.

According to the claimed invention, a computer system includes a portable device whereon at least one opening is formed, and a fixing mechanism for fixing the portable device. The fixing mechanism includes a casing whereon a track is disposed, and a resilient component. The track is for guiding the portable device to slide, and at least one hole is formed on the casing. The resilient component includes a wedging part fixed on the casing, and at least one bending part. An end of the bending part passes through the hole on the casing and inserting into the opening on the portable device so as to fix the portable device inside the casing. The resilient component further includes at least one torsional part. An end of the torsional part is connected to the wedging part, the other end of the torsional part is connected to the other end of the bending part, and the torsional part is for providing torsional force to the bending part so as to drive the end of the bending part to pass through the hole on the casing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
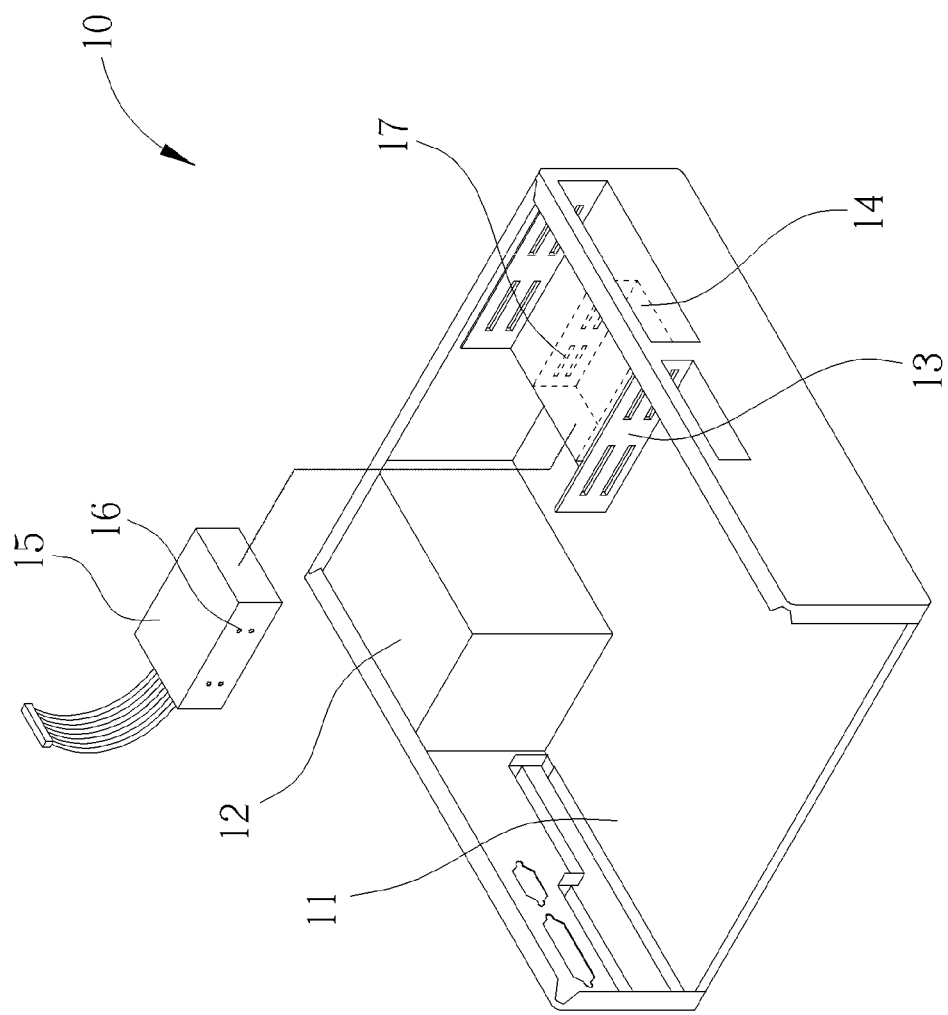
FIG. 1 is a diagram of a computer mechanism in the prior art.
Figure 2:
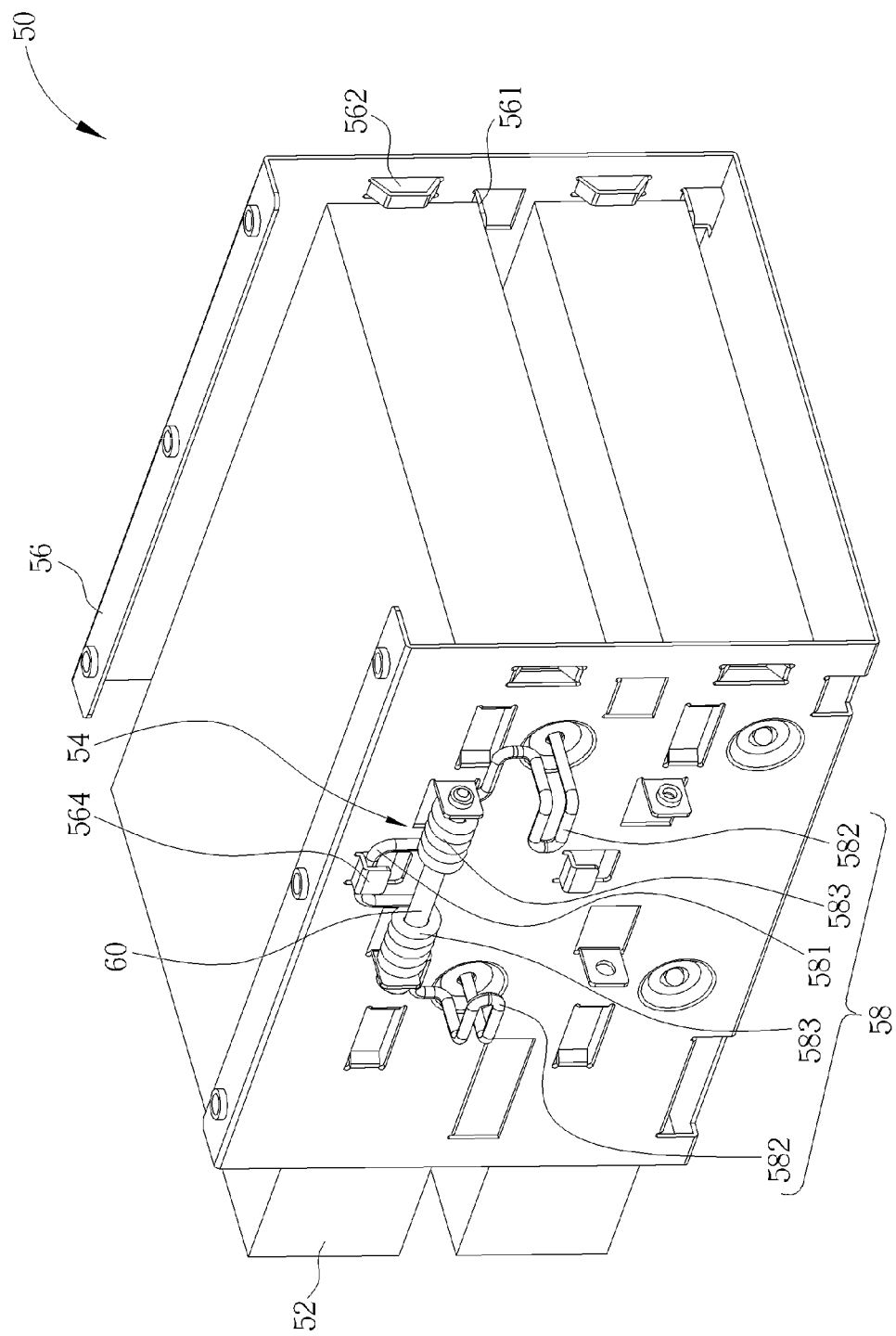
FIG. 2 and FIG. 3 are diagrams of a computer system in different views according to a preferred embodiment of the present invention.
Figure 3:
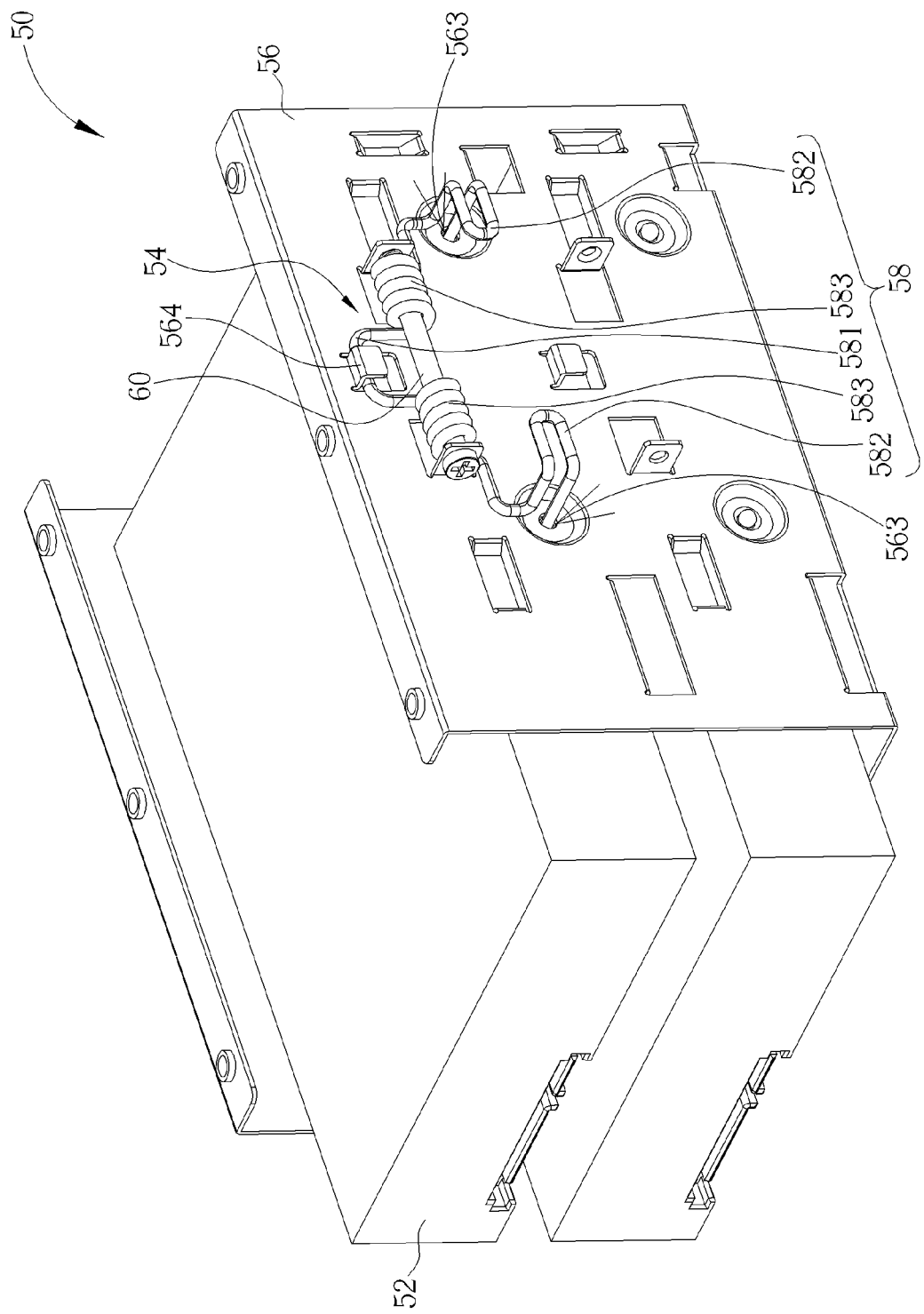
Figure 4:
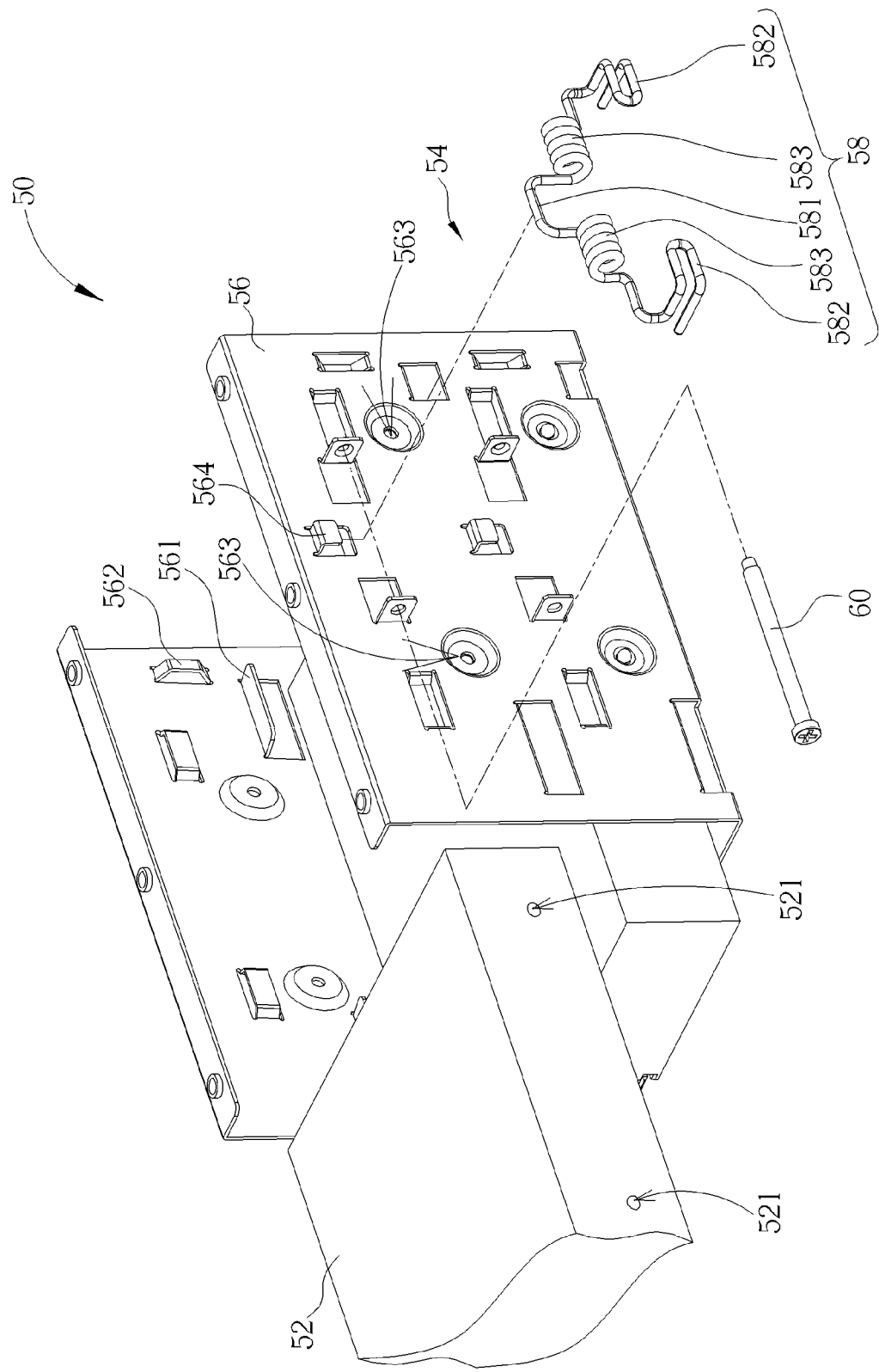
FIG. 4 is an exploded diagram of the computer system according to the preferred embodiment of the present invention.

Please refer to FIG. 2 to FIG. 4. FIG. 2 and FIG. 3 are diagrams of a computer system 50 in different views according to a preferred embodiment of the present invention. FIG. 4 is an exploded diagram of the computer system 50 according to the preferred embodiment of the present invention. The computer system 50 can be a desktop computer system. The computer system 50 includes at least one portable device 52. The portable device 52 can be a storage device, such as a hard disk, an optical disk drive, and so on. At least one opening 521 is formed on the portable device 52. The computer system 50 further includes a fixing mechanism 54 for fixing the portable device 52. The fixing mechanism 54 includes a casing 56 whereon a track 561 is disposed. The track 561 guides the portable device 52 to slide relative to the casing 56, so as to disassemble the portable device 52 from the casing 56 easily. The casing 56 further includes a blocking component 562 for blocking a side of the portable device 52 when the portable device 52 is installed inside the casing 56, so as to position the portable device 52. In addition, at least one hole 563 is formed on the casing 56, and the casing 56 further includes a hook structure 564.

The fixing mechanism 54 further includes a resilient component 58. The resilient component 58 includes a wedging part 581 wedged inside the hook structure 564 of the casing 56, so as to fix the resilient component 58 on the casing 56. The resilient component 58 further includes at least one bending part 582. An end of the bending part 582 passes through the hole 563 on the casing 56 and inserts into the opening 521 on the portable device 52, so as to fix the portable device 52 inside the casing 56. The bending part 582 can be a U-shaped structure. In this embodiment, the resilient component includes two bending parts 582 respectively disposed on two sides of the wedging part 581. Accordingly, two openings 521 are formed on the portable device 52, and two holes 563 are formed on the casing 56 accordingly. When the portable device 52 is installed inside the casing 56 and the blocking component 562 blocks a side of the portable device 52, the two openings 521 on the portable device 52 respectively align with the two holes 563 on the casing 56, so that the end of the bending part 583 can pass through the hole 563 on the casing 56 and insert into the opening 521 on the portable device 52 so as to fix the portable device 52 inside the casing 56.

The resilient component 58 further includes at least one torsional part 583. An end of the torsional part 583 is connected to the wedging part 581, and the other end of the torsional part 583 is connected to the other end of the bending part 582. As the resilient component 58 includes the two bending parts 582, the resilient component 58 accordingly includes two torsional parts 583 respectively connected to the other ends of the two bending parts 582 for providing torsional force to the two bending parts 582. Therefore, the ends of the bending parts 582 pass through the holes 563 on the casing 56 and insert into the openings 521 on the portable device 52, so as to fix the portable device 52 inside the casing 56. The torsional part 583 can be a torsional spring, and the torsional force provided by the torsional part 583 to fix the portable device 52 can be adjusted by controlling winding turns of the torsional spring. Furthermore, the fixing mechanism 54 further includes a fixing shaft 60 passing through the casing 56. The torsional part 583 of the resilient component 58 sheathes the fixing shaft 60, so that the fixing shaft 60 can be a supporting point of the torsional part 583. Besides, the wedging part 581, the bending part 582, and the torsional part 583 can be integrated monolithically. Numbers and positions of the opening 521 on the portable device 52, the hole 563 on the casing 56, and the bending part 582 and the torsional part 583 of the resilient component 58 are not limited to the above-mentioned embodiment, and it depend on actual demand.

Figure 5:
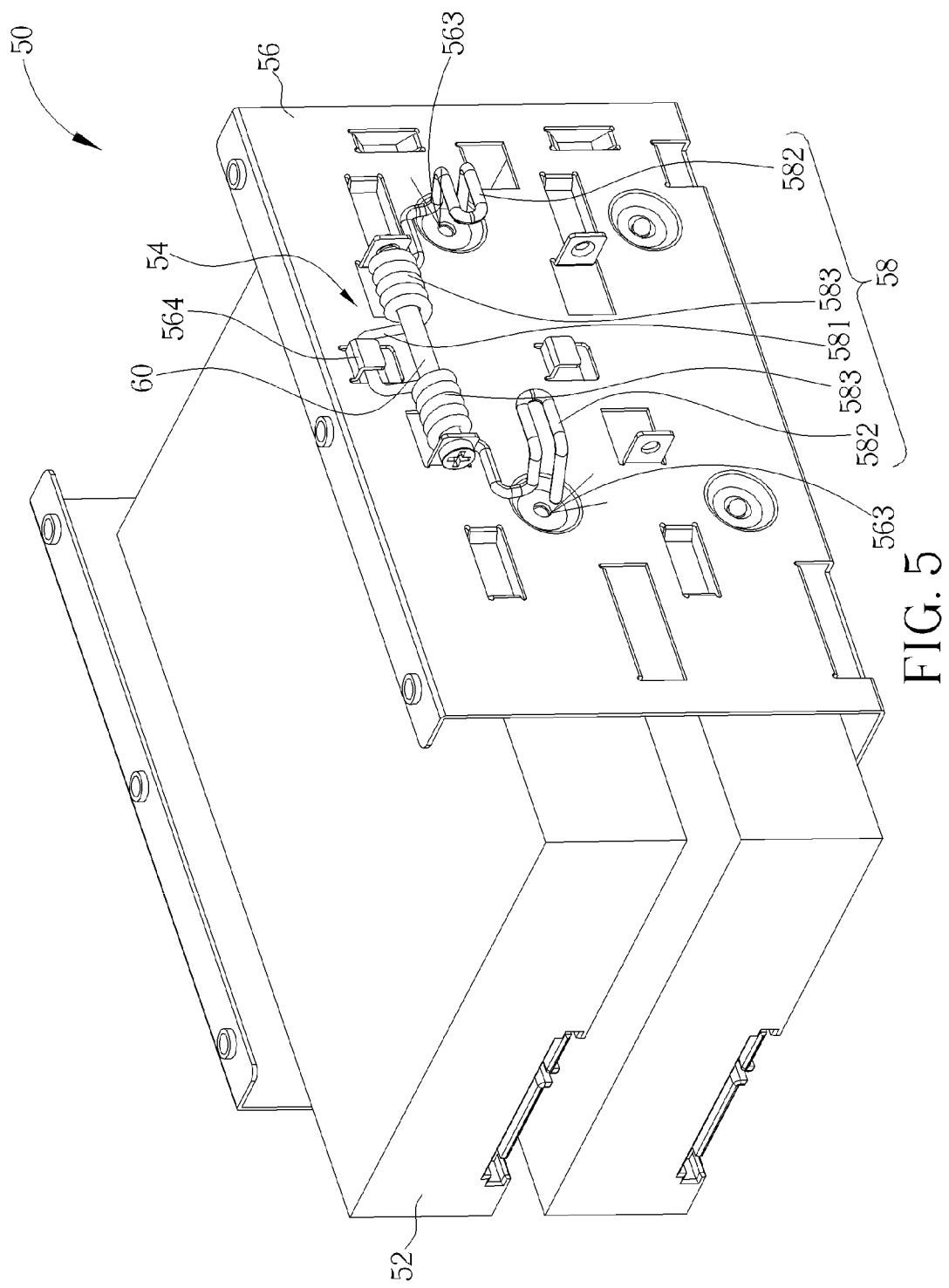
FIG. 5 is a schematic drawing of a resilient component not fixed on a portable device according to the preferred embodiment of the present invention.
Figure 6:
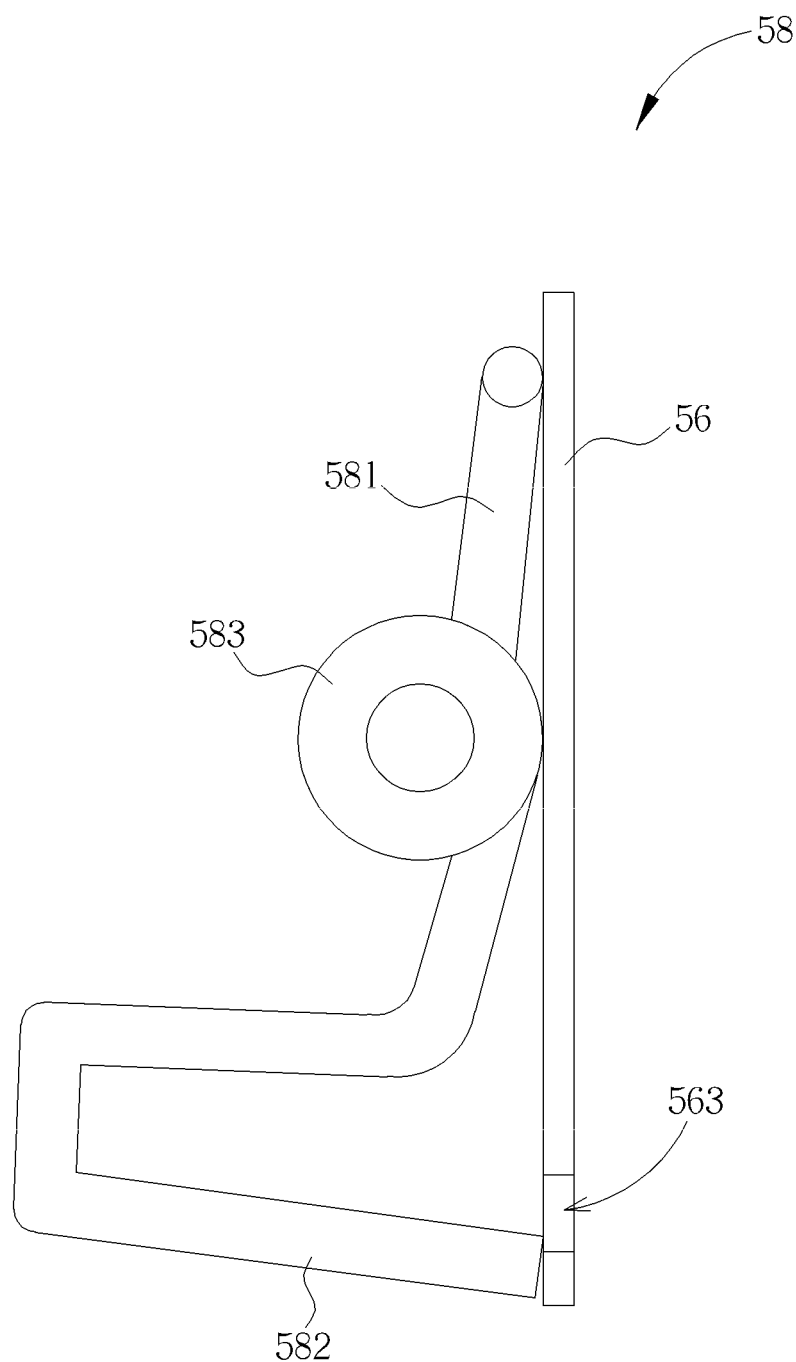
FIG. 6 is a lateral view of the resilient component not fixed on the portable device according to the preferred embodiment of the present invention.
Figure 7:
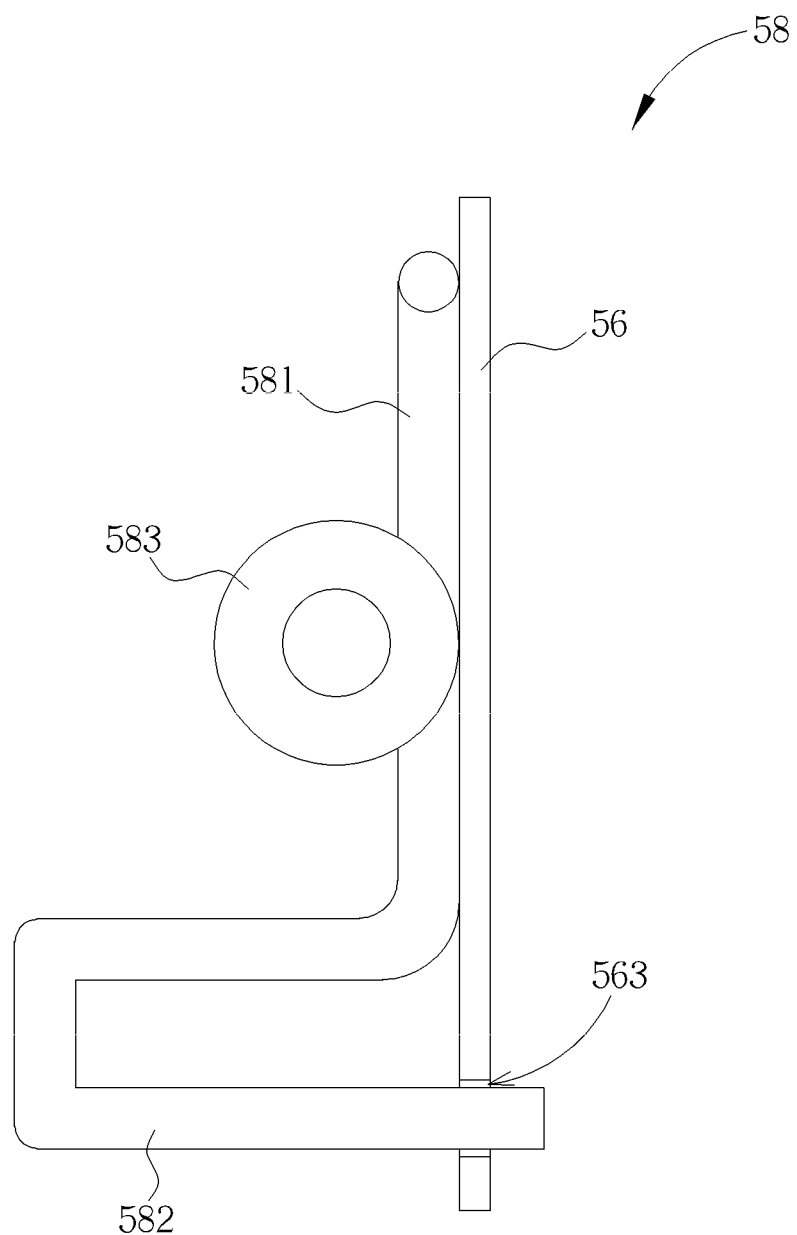
FIG. 7 is a lateral view of the resilient component fixed on the portable device according to the preferred embodiment of the present invention.

Please refer to FIG. 2 to FIG. 7. FIG. 5 is a schematic drawing of the resilient component 58 not fixed on the portable device 52 according to the preferred embodiment of the present invention. FIG. 6 is a lateral view of the resilient component 58 not fixed on the portable device 52 according to the preferred embodiment of the present invention. FIG. 7 is a lateral view of the resilient component 58 fixed on the portable device 52 according to the preferred embodiment of the present invention. As shown in FIG. 5 and FIG. 6, when the resilient component 58 is not fixed on the portable device 52, the bending part 582 and the torsional part 583 of the resilient component 58 are distant from the casing 56. At this time, the end of the bending part 582 does not align with the hole 563 on the casing 56, so that the portable device 52 is not fixed inside the casing 56 and can be drawn out freely. When the portable device 52 is fixed inside the casing 56, the wedging part 581 of the resilient component 58 can be pressed so as to drive the torsional part 583 to rotate for providing the torsional force to the bending part 582. Then, the end of the bending part 582 aligns with the hole 563 on the casing 56 and further passes through the hole 563 on the casing 56 and inserts into the opening 521 on the portable device 52, so as to fix the portable device 52 inside the casing 56 stably, as shown in FIG. 2, FIG. 3, and FIG. 7. On the other hand, when disassembling the portable device 52 by releasing the resilient component 58, the two bending parts 582 can be pressed inwardly and simultaneously, which means the distance between the two bending parts 528 is decreased so as to resist the torsional force provided by the torsional part 583. Therefore, the end of the bending part 583 separates from the hole 563 on the casing 56, and the portable device 52 can be drawn out of the casing 56.

Comparing to the prior art, the fixing mechanism for fixing the portable device of the present invention can improve the conventional drawbacks that assembly of the portable device is inconvenient and complicated. Because the fixing mechanism of the present invention does not utilizes screws, the assembly difficulty and the working hours of the present invention are decreased, so as to promote assembly convenience.

Those skilled in the art will readily observe that numerous modifications and alterations of the device and method may be made while retaining the teachings of the invention.

What is claimed is:

1. A fixing mechanism comprising:
   a casing whereon a track is disposed, the track being for guiding a portable device to slide, and two holes being formed on the casing; and
   a resilient component comprising:
      a wedging part fixed on the casing;
      two bending parts, an end of each bending part passing through the corresponding hole on the casing and inserting into an opening on the portable device so as to fix the portable device inside the casing; and
      two torsional parts, an end of each torsional part being connected to the wedging part, the other end of each torsional part being connected to the other end of the corresponding bending part, and each torsional part being for providing torsional force to the corresponding bending part so as to drive the end of the corresponding bending part to pass through the corresponding hole on the casing, the two bending parts being pressed close to each other so as to resist the torsional force provided by the two torsional parts, for separating the end of each bending part from the corresponding hole on the casing.

2. The fixing mechanism of claim 1 further comprising:
a fixing shaft passing through the casing, and the two torsional parts of the resilient component sheathing the fixing shaft.

3. The fixing mechanism of claim 1, wherein the casing further comprises a hook structure, and the wedging part of the resilient component is wedged inside the hook structure.

4. The fixing mechanism of claim 1, wherein each bending part is a U-shaped structure.

5. The fixing mechanism of claim 1, wherein each torsional part is a torsional spring.

6. The fixing mechanism of claim 1, wherein the wedging part, the two bending parts, and the two torsional parts are integrated monolithically.

7. The fixing mechanism of claim 1, wherein the casing further comprises at least one blocking component for blocking a side of the portable device when the portable device is installed inside the casing.

8. A computer system comprising:
a portable device whereon two openings are formed; and
a fixing mechanism for fixing the portable device, the fixing mechanism comprising:
    a casing whereon a track is disposed, the track being for guiding the portable device to slide, and two holes being formed on the casing; and
    a resilient component comprising:
        a wedging part fixed on the casing;
        two bending parts, an end of each bending part passing through the corresponding hole on the casing and inserting into the corresponding opening on the portable device so as to fix the portable device inside the casing; and
        two torsional parts, an end of each torsional part being connected to the wedging part, the other end of each torsional part being connected to the other end of the corresponding bending part, and each torsional part being for providing torsional force to the corresponding bending part so as to drive the end of the corresponding bending part to pass through the corresponding hole on the casing, the two bending parts being pressed close to each other so as to resist the torsional force provided by the two torsional parts, for separating the end of each bending part from the corresponding hole on the casing and the corresponding opening on the portable device.

9. The computer system of claim 8, wherein the fixing mechanism further comprises a fixing shaft passing through the casing, and the two torsional parts of the resilient component sheathe the fixing shaft.

10. The computer system of claim 8, wherein the casing further comprises a hook structure, and the wedging part of the resilient component is wedged inside the hook structure.

11. The computer system of claim 8, wherein each bending part is a U-shaped structure.

12. The computer system of claim 8, wherein each torsional part is a torsional spring.

13. The computer system of claim 8, wherein the wedging part, the two bending parts, and the two torsional parts are integrated monolithically.

14. The computer system of claim 8, wherein the casing further comprises at least one blocking component for blocking a side of the portable device when the portable device is installed inside the casing.

* * * * *